S. W. MORROW AND J. SCHLUTTER.
PISTON RING.
APPLICATION FILED NOV. 9, 1921.

1,426,403. Patented Aug. 22, 1922.

Inventors:
Samuel Wilson Morrow,
John Schlutter,
by Spear, Middleton, Donaldson & Hall.
Attys.

UNITED STATES PATENT OFFICE.

SAMUEL WILSON MORROW AND JOHN SCHLUTTER, OF BALTIMORE, MARYLAND, ASSIGNORS TO THE REUS BROS. CO., OF BALTIMORE, MARYLAND, A CORPORATION OF MARYLAND.

PISTON RING.

1,426,403.

Specification of Letters Patent. Patented Aug. 22, 1922.

Application filed November 9, 1921. Serial No. 513,966.

*To all whom it may concern:*

Be it known that we, SAMUEL W. MORROW and JOHN SCHLUTTER, citizens of the United States, and residents of Baltimore, Maryland, have invented certain new and useful Improvements in Piston Rings, of which the following is a specification.

The present invention relates to improvements in metallic packing rings designed for use in internal combustion engines.

The invention aims to provide a packing ring which will be of a nature which will reduce the wear on the cylinder walls to a minimum, and in which liability of breakage will be eliminated or reduced to a minimum thereby reducing or abolishing the danger of scoring the cylinder walls by the action of broken ring parts.

The invention further aims to provide a ring which may be much more economically manufactured than rings heretofore produced.

With these and other objects in view, the invention includes the novel article hereinafter described and defined by the appended claims, the invention being illustrated by the accompanying drawing, in which—

Figure 1:
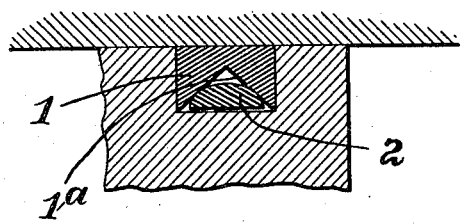
Fig. 1 is a sectional view of one form of our device, showing its relation to the piston groove and the cylinder wall.
Figure 2:
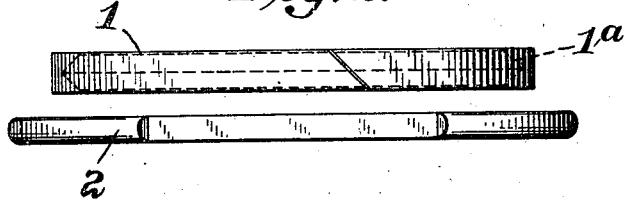
Fig. 2 is a side elevation of the disassembled ring and expander of Fig. 1.
Figure 3:
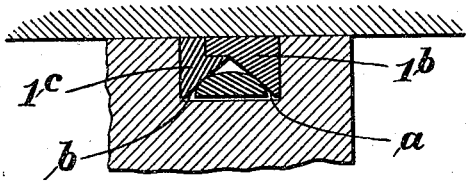
Fig. 3 is a sectional view of an overlapped ring.
Figure 4:
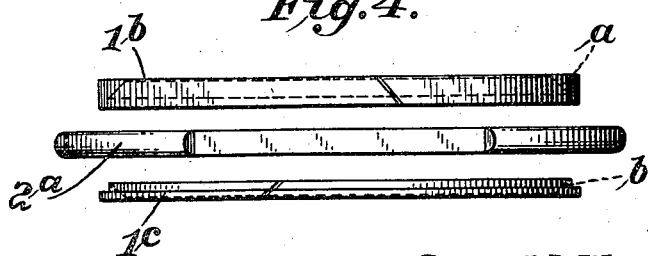
Fig. 4 is a side elevation of the disassembled ring of Fig. 3.

Referring by reference characters to this drawing, in its simpler form, the invention comprises a single split packing ring 1 of a size and shape to fit the ordinary piston groove, which ring we make of bronze or other bearing materials which do not retain inherent spring tension, which is of a nature to reciprocate in contact with the cylinder walls, with a minimum amount of wear of said walls.

This material lacks the resiliency of spring necessary to keep it pressed or expanded against the cylinder wall, and to secure this expanding action we provide an expanding split ring 2 of suitable spring or resilient metal, conveniently of steel, which is located in a groove 1ª in the inner face of the ring 1.

In another embodiment of the invention the ring 1 is made of two split parts 1ᵇ and 1ᶜ having overlapping annular ribs or flanges and inclined inner walls $a$ and $b$ which form a channel to receive the expanding ring 2ª which not only tends to expand the rings but also to separate them so as to press them against the opposing walls of the groove and thereby sealing the same and prevent the pumping of oil, and wear on piston ring grooves.

Either the ring 1 of the first form described, or the duplex rings 1ᵇ and 1ᶜ of the second form, may be made by drawing the metal to the required shape in cross section by suitable dies and thereafter bending it into the required curve due to the fact that no temper is necessary; and as the expander may be formed from ordinary resilient steel wire, the complete piston rings may be very economically manufactured.

The bronze or other bearing material not retentive of inherent spring tension and being relatively soft does not have as great a wearing action on the cylinders as piston rings heretofore constructed, and the drawn metal is much less liable to break, and in fact may be said to be entirely free from danger of breakage.

Having thus described our invention, what we claim is:

1. A multiple part piston ring including a drawn bronze outer member contacting with the wall of the cylinder and a side wall of the piston ring groove, and a separate resilient expander member cooperating therewith.

2. A multiple part piston ring including a drawn metal member in the piston ring groove and contacting with the walls of the cylinder and a side wall of the ring groove, and a separate resilient expander ring cooperating therewith.

3. A multiple part piston ring including a drawn metal member of the full width of the groove in the piston adapted to bear against the cylinder wall, and a separate resilient expander ring cooperating therewith.

In testimony whereof, we affix our signatures.

SAMUEL WILSON MORROW.
JOHN SCHLUTTER.